United States Patent [19]
Buluschek

[11] Patent Number: 5,690,971
[45] Date of Patent: Nov. 25, 1997

[54] TILTABLE EXTRUSION DIE HAVING SEALING LIP CONNECTED BY THIN ANNULAR ZONE

[75] Inventor: Bruno Buluschek, Echandens, Switzerland

[73] Assignee: E. Kertscher S.A., Yvonand, Switzerland

[21] Appl. No.: 670,431

[22] Filed: Jun. 26, 1996

[30] Foreign Application Priority Data

Jun. 29, 1995 [FR] France ................................ 95 07845

[51] Int. Cl.⁶ .................................................. B29C 47/06
[52] U.S. Cl. ........................ 425/113; 425/466; 277/236
[58] Field of Search ................................ 277/205, 236, 277/207 A; 285/107, 109, 110, 95, 917; 425/113, 114, 133.1, 131.1, 461, 466, 467

[56] References Cited

U.S. PATENT DOCUMENTS

| | | | |
|---|---|---|---|
| 1,302,778 | 5/1919 | Drewry | 285/107 |
| 2,185,701 | 1/1940 | Boyle | 425/113 |
| 2,943,351 | 7/1960 | Gray | 425/113 |
| 3,222,721 | 12/1965 | Reynolds, Jr. | 18/13 |
| 3,752,614 | 8/1973 | Bremer | 425/113 |
| 3,947,173 | 3/1976 | Dougherty | 425/113 |
| 4,260,351 | 4/1981 | Takano et al. | 425/113 |
| 4,362,323 | 12/1982 | Lodder et al. | 285/110 |
| 4,473,230 | 9/1984 | Adamek | 277/236 |
| 4,641,841 | 2/1987 | Regan | 277/236 |
| 4,690,627 | 9/1987 | Sebille | 425/113 |
| 4,838,777 | 6/1989 | Weber | 425/113 |
| 5,151,147 | 9/1992 | Foster et al. | 425/113 |
| 5,443,589 | 8/1995 | Brandon | 277/236 |

FOREIGN PATENT DOCUMENTS

| | | |
|---|---|---|
| 320 265 | 2/1975 | Australia . |
| 21 53 962 | 8/1972 | Germany . |
| 87 05238 | 9/1987 | WIPO . |

*Primary Examiner*—Scott Cummings
*Attorney, Agent, or Firm*—Griffin, Butler, Whisenhunt & Kurtossy

[57] ABSTRACT

A sealing device for assuring a sealed junction between two ducts (3 and 11, 13) for conveying plastic material at a high temperature and under high pressure in a machine for transforming plastic material, includes a first part (2) defining the first duct (3) and a second part (9) defining the second duct (11, 13), the second part being inserted in the first duct. The second part (9) comprises at one end an annular lip (16) protruding from its external cylindrical surface and connected to the one end by a thin annular zone (17). The lip (16) has a cylindrical external surface (18) which abuts the internal surface of the first part (2) under a mechanical bias due to the dimensional tolerances of the external surface (18) of the lip (16) and the internal surface of the first cylindrical part (2).

5 Claims, 3 Drawing Sheets

TILTABLE EXTRUSION DIE HAVING SEALING LIP CONNECTED BY THIN ANNULAR ZONE

FILED OF THE INVENTION

The invention concerns a sealing device, in particular for machines for transforming plastic material.

More particularly, the invention concerns a device enabling the sealing between two mechanical elements intended to convey a flow of fused plastic material under high pressure.

BACKGROUND OF THE INVENTION

A typical example where problems of sealing arise in this area of technology, is that of extrusion dies in which the temperature of the fused plastic material can rise to 500° C. or higher under a pressure which can sometimes reach 1000 bars.

In such operating conditions and in particular because of the high temperature of the plastic material, the sealing cannot be assured by rubber or synthetic gaskets.

For these cases, use has usually been made of sealing devices which utilise metal elements, which, in order to seal tight vis-à-vis each other, are provided with very carefully rectified surfaces with very close tolerances. These elements are then pressed very hard against each other to make it impossible for the plastic material to pass outside the flow passage.

Sealing conditions of this type have the disadvantage of requiring the elements to be assembled to be manufactured with great precision and of then forming a rigid assembly which does not allow any correction or adjustment of the two elements in relation to each other.

SUMMARY OF THE INVENTION

A principal aim of the invention is thus to provide a sealing device, in particular for a machine for transforming plastic material, able to be manufactured with relatively wide tolerances and enabling, to a certain extent, a movement of the elements in relation to each other to assure certain corrections or adjustments.

The invention thus concerns a sealing device for assuring the sealed junction between two ducts intended to convey a fluid, in particular a flow of plastic material at a high temperature and under high pressure, this device comprising a first part of generally cylindrical shape and defining at least in part the first duct and a second part also of generally cylindrical shape defining at least in part the second duct, said second part being inserted in said first duct, characterised in that said second part comprises, at least one of its ends, an annular lip protruding from its external cylindrical surface and connected to this end by a thin annular zone, said lip having an external cylindrical surface which abuts the internal surface of said first part under a mechanical bias due to the dimensional tolerances of said external surface of said lip and said internal surface of said first cylindrical part.

As a result of these features, a perfect sealing is obtained at the junction between the two ducts which is more efficient the higher the pressure of the plastic material.

BRIEF DESCRIPTION OF THE DRAWINGS

Other features and advantages of the invention will appear during the description which follows, given solely by way of example and made with reference to the attached drawings in which.

DESCRIPTION OF PREFERRED EMBODIMENTS

Figure 1:
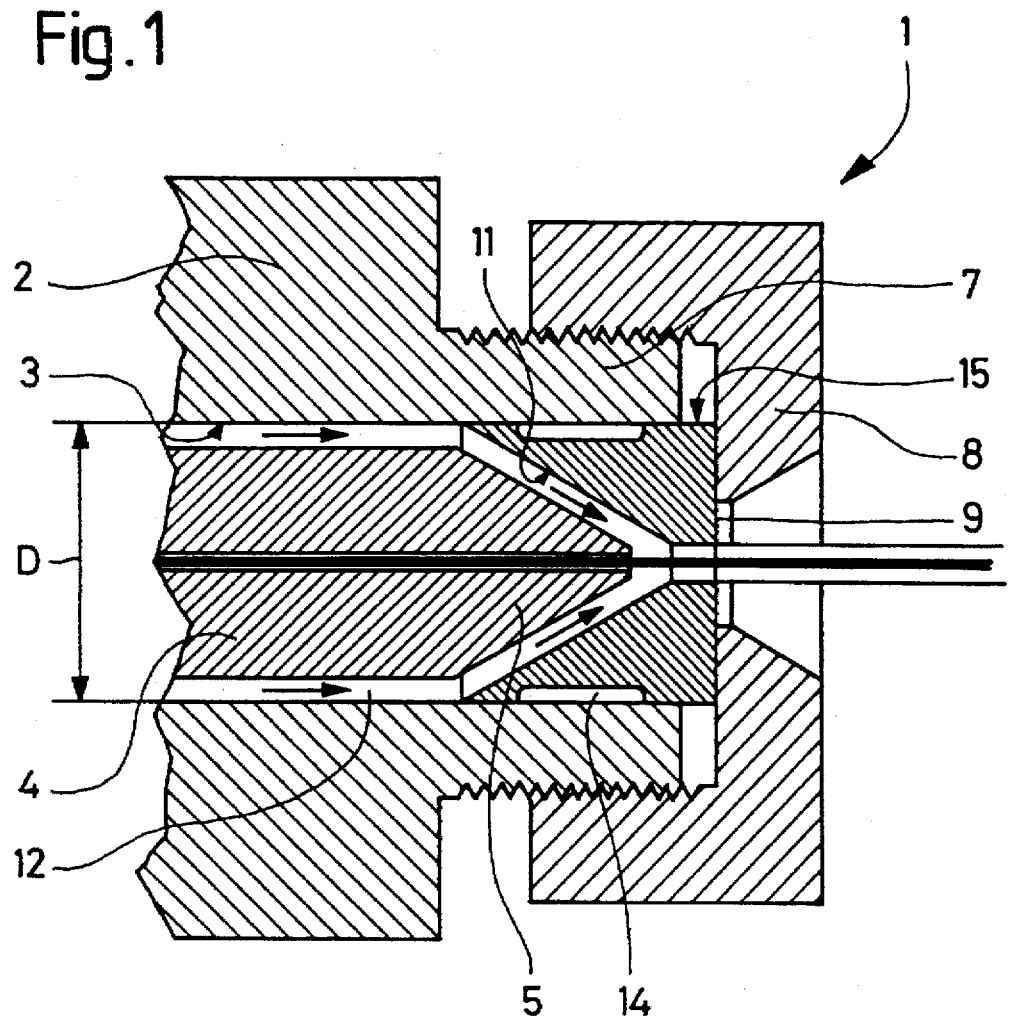
FIG. 1 is a schematical cross-section of a part of an extrusion head, intended to coat a wire with plastic material, incorporating the features of the present invention.

FIG. 1 shows a first application example of the sealing device according to the invention to a plastic extrusion head 1 only a part of which has been shown in the drawing. For reasons of convenience, this part will be designated by "extrusion head" in the description which follows. The body 2 of this extrusion head has a passage 3 with a cylindrical section, through which the fused plastic material is brought at high pressure. In the present example, a wire guide 4 which ends in a conical part 5 is mounted coaxially in duct 3. A metal wire 6 which is to be coated with plastic material passes therethrough. For example, it may be a copper wire which has to be sheathed with an insulating material.

Body 2 of extrusion head i comprises an externally threaded tip 7 onto which a nut 8 is screwed. The latter is used to keep in place a die 9 which is arranged in duct 3 of body 2 and on which the sealing device according to the invention is arranged.

Die 9 has a generally cylindrical shape and defines a central passage 10 comprising a conical part 11 of the same conicity as that of wire guide 4. The latter is placed in duct 3 so as to define therein a flow channel 12 for the plastic material on which the gauged orifice 13 of die 9 is connected.

The envelope of the external surface of die 9 is cylindrical. This external surface has an annular groove 14 whose axial dimension (i.e. its width) extends over a significant part of the total axial dimension of the die so that the latter is free in this area of the internal surface of body 2. Thus, this groove 13 defines, on the one hand downstream in relation to the flow of plastic material, an external bearing 15 which extends slightly further than tip 7 of body 2 and, on the other hand upstream, a lip 16 which forms the principal element of the sealing device according to the invention.

Figure 2:
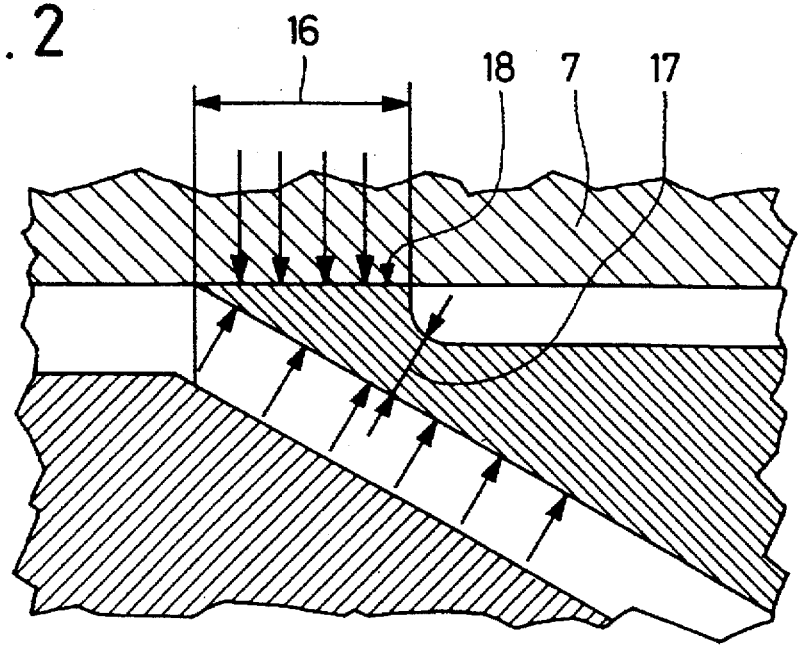
FIG. 2 shows on a larger scale how the pressure is distributed on the profile of the part acting as the seal of the sealing device according to the invention.

The profile of lip 16 appears on a larger scale in FIG. 2. One sees that, in the present example, it has a triangular radial section shape connected to the body of die 9 via a generally thin annular connecting zone 17 intended to become deformed to its elastic deformation limit when the die is placed in duct 3 and also while the plastic material flows in flow channel 12. The lip itself has externally a cylindrical surface 18 whose diameter is slightly greater than that of the body of the die.

By way of example only, if according to the usual standard ISO/VSM 58400, the diameter of passage 3 of body 2 of the extrusion head is made with the tolerance H6, the cylindrical envelope surface of die 9 will have the same diameter made with tolerance k6, 16 or m6 according to the material used for the die. The latter will thus be difficult to mount in the duct of the body, but it will not have to be driven therein. As regards 15, it has a diameter adjusted to that of passage 3 with a relatively wide tolerance.

Likewise, and given its jointing to the body of the die via the thin zone 17, the assembly will slightly deform itself when it is inserted into duct 3 and will undergo a mechanical bias which will apply surface 18 of lip 16 firmly against the internal surface of passage 3. It will be noted that the contact pressure between the two surfaces will be greater the greater the pressure of the plastic material flowing in channel 12. Consequently, the quality of the sealing will always be guaranteed.

Figure 3:
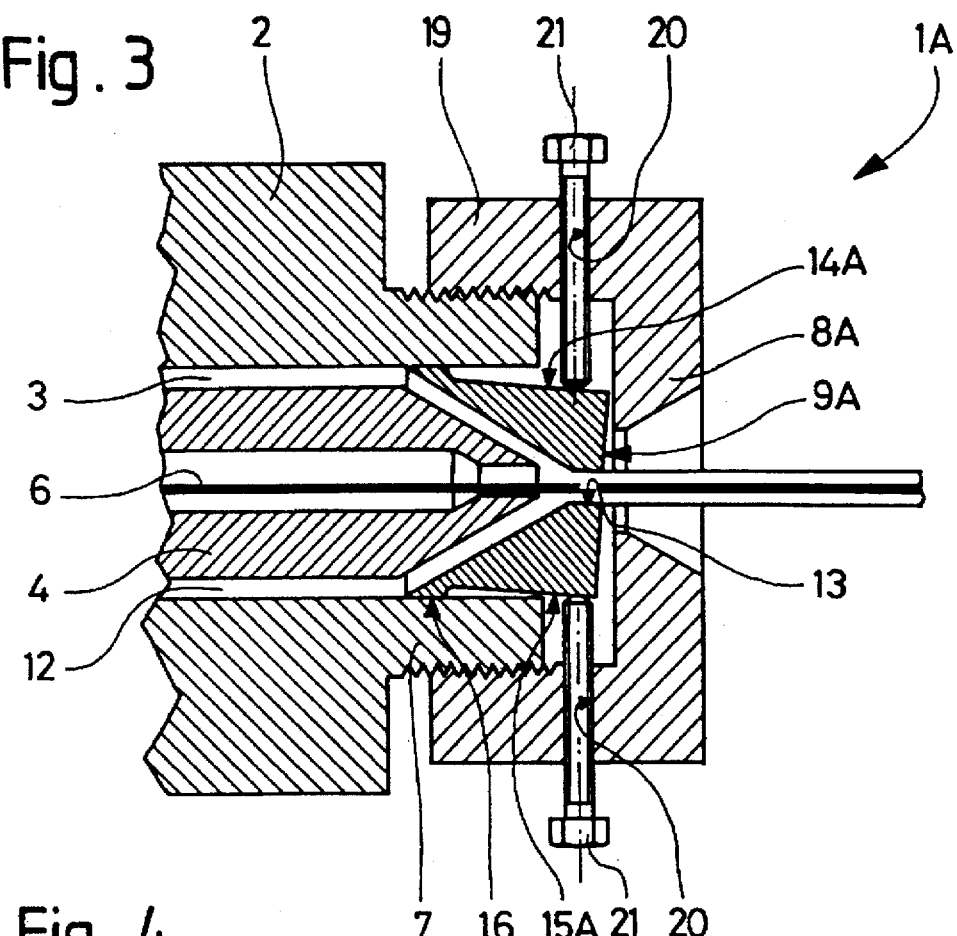
FIG. 3 is a schematical cross-section of a part of an extrusion head provided with a sealing device according to the invention allowing the coaxiality of the die to be adjusted.

FIG. 3 shows an axial cross-section of a part 1A of an extrusion head (which will be designated below by "extrusion head 1A") which incorporates a particularly advantageous feature of the invention.

This extrusion head comprises a body 2 and a wire guide 4 identical to those provided in the extrusion head shown in FIG. 1.

However, this extrusion head 1A comprises a die 9A whose shape is slightly different to that of die 9 shown in FIG. 1. Except for annular lip 16, its external surface has no unevenness, but on the contrary a cylindrical surface 15A of a constant diameter slightly less than that of passage 3 of the body of extrusion head 1A.

In addition, the latter comprises a nut 8A used not only for immobilising die 9A in duct 3, but also for the radial adjustment of the latter.

More precisely, the cylindrical skirt 19 of this nut 8A has two radial threaded holes 20, preferably aligned with each other. These holes are intended to receive adjusting screws 21.

As shown in a exaggerated manner in FIG. 3, this arrangement enables the axis of die 9A to be inclined slightly in relation to that of passage 3 and thus that of wire guide 1 by acting on adjusting screws 21. This inclination goes hand in hand with an asymmetrical deformation of lip 16 of die 9A whose jointing zone 17 becomes slightly deformed. One can thus adjust the coaxiality of gauged orifice 13 of die 9A and of the wire 6 to be coated with plastic material, and one can thus assure a uniform thickness of coating around this wire. Tests have shown that one can thus obtain a relative inclination of the axes of passage 3 and die 9A able to reach 3°, which is ample to obtain in any circumstances a good coaxiality between wire 6 and its insulating coating. This inclination by no means prejudices a good sealing at lip 16 whose surface 17 remains firmly applied against the surface of passage 3. In addition, screws 21 allow a fine inclination adjustment. Finally, the assembly avoids any stagnation of the plastic material in the flow channel and the gauged orifice of the die.

Solely by way of example, one obtains satisfactory results if $$\frac{1}{5} \geq s/D \geq \frac{1}{100} \text{ and}$$

$$\frac{1}{25} \geq d/D \geq \frac{1}{500}$$

where:

s=axial length of surface 18

D=diameter of duct 3 d=thickness of thin zone 17 and by using a nitrided steel with a high elasticity limit, hardened to 1000 HV.

Figure 4:
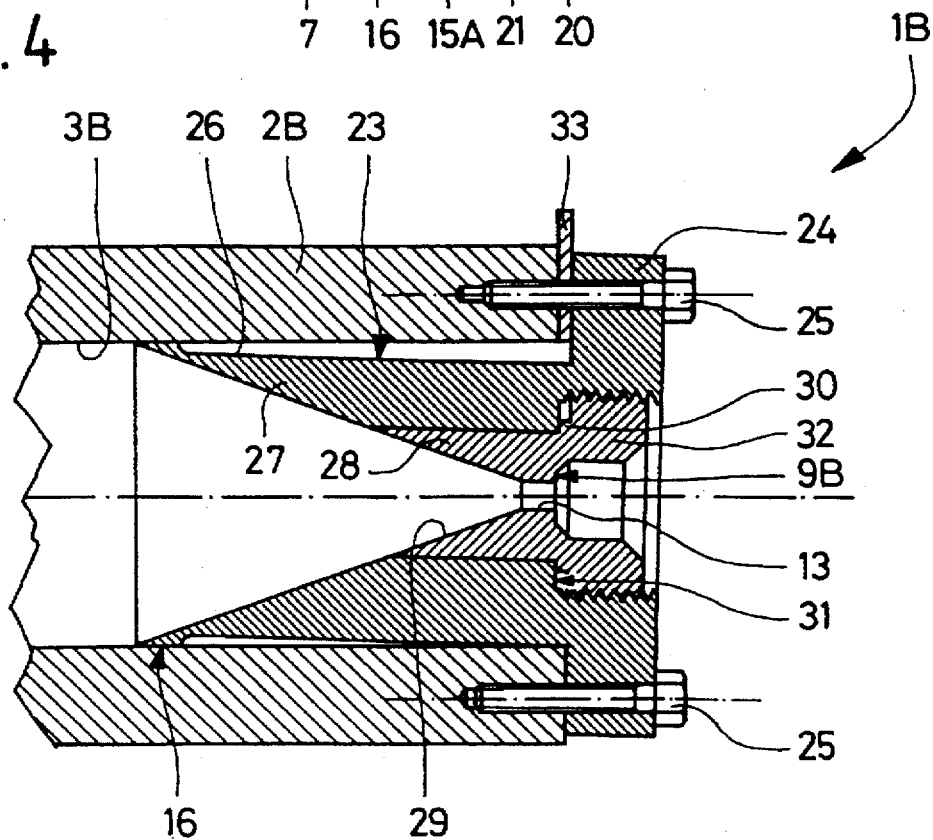
FIG. 4 is a schematical cross-section of a part of an extrusion head provided with a sealing device according to the invention made on a die-carrying part.

Part 1B of the extrusion head (which will be designated below by "extrusion head 1B") according to the embodiment of FIG. 4 comprises a body 2B formed of a simple tubular piece. In the cylindrical duct 3B of this body 2B a die carrier 23 is inserted acting as an intermediate assembly part of an actual die 9B.

Die carrier 23 is a tubular piece on one end of which is arranged annular lip 16 of the sealing device according to the invention. At its other end, die carrier 23 is provided with a fixing flange 24 by means of which it is fixed to body 2B with the aid of axially oriented screws 25. Between annular lip 16 and flange 24, this die carrier has an external surface 26 of a uniform diameter markedly less than that of passage 3B of body 2B.

Internally, die carrier 23 has a bore whose back part 27 is conical and extends the internal surface of lip 16. On this conical part 27 a straight cylindrical part 28 intended to receive die 9B is connected at the front.

The latter has an internal bore with a conical back part 29 connecting in turn on conical part 27 of die carrier 23. The front part of this bore forms gauged orifice 13 of the extrusion head. In addition, the die has in the front a support flange 30 intended to abut a radial shoulder 31 arranged in die carrier 23 at the level of flange 24. The latter is threaded internally and receives a fixing nut 32 which immobilises die 9B in die carrier 23.

As in the embodiment of FIG. 3, the axis of die 9B may be inclined in relation to that of passage 3B by inserting a block 33 between flange 24 and body 2B at a determined place on the periphery of this flange.

Figure 5:
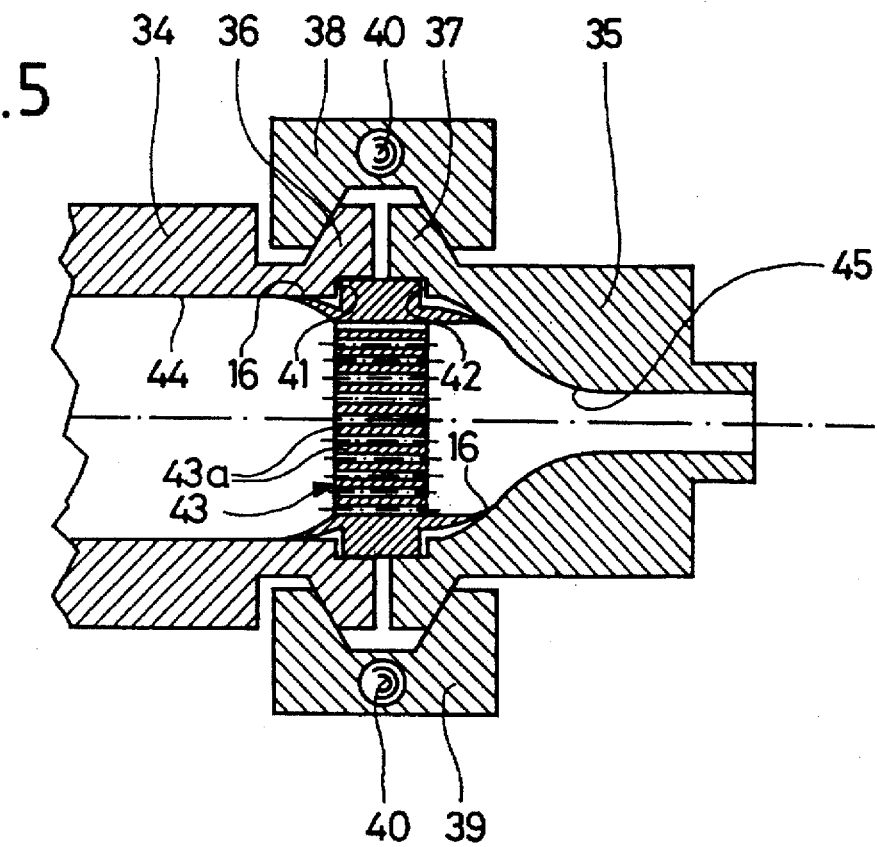
FIG. 5 illustrates, via a schematical cross-section, how, in an extrusion head, a sealing device according to the invention may be used with a plate for distributing the plastic material.

The sealing device according to the invention according to the embodiment of FIG. 5 is used at the junction of two mechanical tubular parts 34 and 35 intended to convey a flow of plastic material from a pipe of a given section to a pipe of equal or smaller section.

These parts 34 and 35 are each provided with a connecting flange 36, 37 with a truncated clamping face with which two clamping half collars 38 and 39 co-operate together surrounding the two parts 34 and 35. These half collars are fixed to each other by fixing screws extending parallel in a radial plane of the assembly and passing through holes 40 which are provided therein for this purpose.

Each of the flanges also has a radial shoulder 41, 42 which is abutted by a plate with openings 43 intended to make the flow profile of the plastic material uniform downstream of part 35. Via its openings 43a this plate thus constitutes a second channel formed by each of the passages defined respectively by parts 34 and 35.

Plate with openings 43 is thus inserted in each of first channels 44 and 45 and comprises two annular lips 16 which respectively extend axially from its radial faces and abut the respective internal surfaces of channels 44 and 45 of parts 34 and 35. These lips assure the sealing of the junction, the more efficiently the higher the pressure of the plastic material in the Channels. Furthermore, this pressure also assures the abutment of flanges 36 and 37 against clamping half collars 38 and 39.

Figure 6:
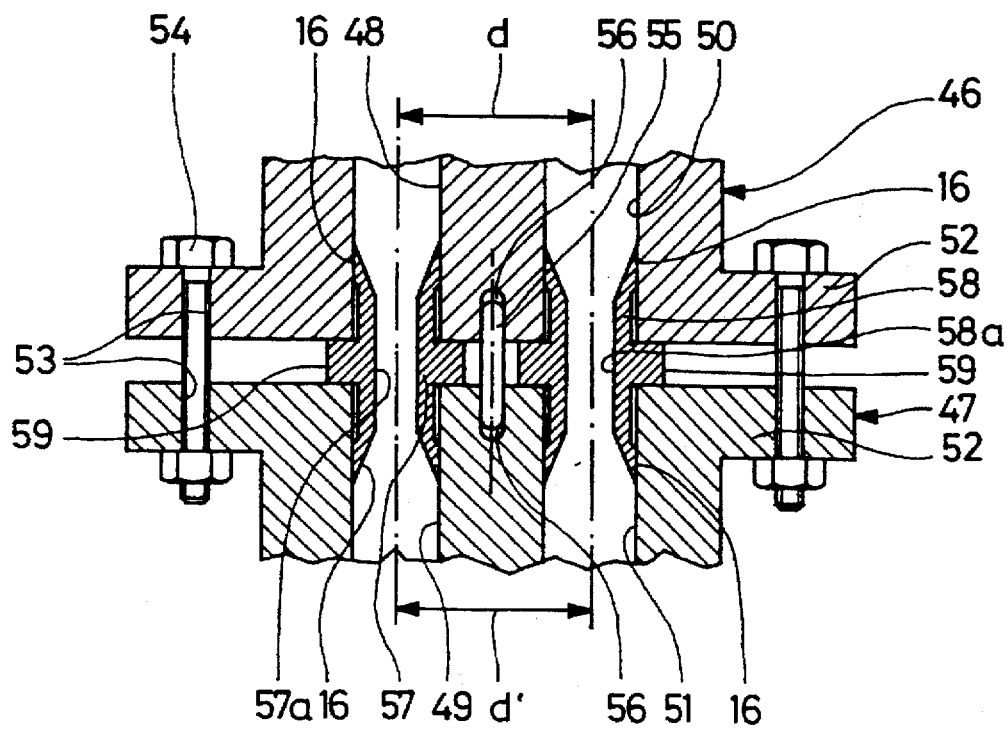
FIG. 6 shows another application of the sealing device according to the invention to the sealed connection between two connecting flanges between the ducts conveying a plastic material at high temperature and pressure.

FIG. 6 shows another application of the sealing device according to the invention in which it is concerned with assuring the sealing between two connecting parts 46 and 47 forming a junction in two parallel pipes able to convey plastic material at a high temperature and under high pressure.

Connecting parts 46 and 47 each define first parallel channels, respectively 48, 49 and 50, 51 and each comprise a fixing flange 52 provided with holes 53 for the passage of tightening screws 54. A centering pin 55 is provided along the axis of the two aligned parts 46 and 47, and is inserted in corresponding axial holes 56 of these connecting parts.

In this case the sealing device comprises two sleeves 57 and 58 respectively inserted in the pairs of aligned channels 48, 49 and 50, 51 and each defining a second channel 58a and 58b. Each of these sleeves comprises at each of its ends an annular lip 16 with the same profile as the annular lip shown in FIG. 2. Each sleeve 57, 58 is further provided with an annular rib 59 by means of which it is axially positioned, this rib being held between the opposing faces of flanges 52 when the assembly is assembled.

If the nominal distance between the axes of passages 48, 49 and 50, 51 of the connecting parts is identical, there may however be an alignment fault in this assembly for example because of a difference in thermal expansion between the parts or unavoidable manufacturing tolerances. These defects are easily compensated and create no sealing problem at the junction, given the fact that thanks to the device according to the invention, lips 16 remain resiliently applied against the internal surfaces of the passages as long as the tolerances remain within reasonable limits which can be respected easily during manufacturing of the parts.

What is claimed is:

1. An extrusion head for extruding plastic material, said head comprising:
    a body having a hollow generally cylindrical shape with an internal surface defining at least in part a first duct extending in an axial direction and having a first diameter;
    a die having one end extending into said first duct, said die having a generally cylindrical external surface with a diameter less than said first diameter to permit tilting of said die relative to said axial direction, said die having an internal surface defining at least in part a second duct; and
    a sealing device for sealing a junction between said first duct and said second duct to permit flow of a plastic material under high pressure between the first and second ducts even though said die is tilted relative to said axial direction, said sealing device comprising a metal annular lip protruding radially from the external cylindrical surface of said die at said one end of said die, said lip being connected to said die by a thin annular zone, said lip having an external cylindrical surface abutting the internal surface of said body under a mechanical bias due to dimensional tolerances of said external surface of said lip and said internal surface of said body, said annular zone being thin enough to flex when said die is not aligned in said axial direction with said first duct.

2. An extrusion head according to claim 1 and further comprising means for decentering said second duct in relation to the axis of said first duct, said decentering means being arranged for deforming said annular zone connecting said lip and said die.

3. An extrusion head as claimed in claim 1 and further comprising means for adjusting the orientation of said second duct relative to said axial direction by tilting said die.

4. An extrusion head as claimed in claim 3 wherein said means for adjusting comprises a cylindrical skirt threadedly secured to said body and adjusting screws extending through said skirt to engage the external surface of said die.

5. An extrusion head as claimed in claim 1 wherein said die and lip are made of a nitrided steel and $$1/5 \geq s/D \geq 1/100 \text{ and}$$

$$1/25 \geq d/D \geq 1/500$$

where s is the length of said lip in the axial direction, D is the diameter of said first duct, and d is the thickness of said thin annular zone.

* * * * *